Sept. 23, 1952 W. A. PARRISH 2,611,349
OPPOSED PISTON INTERNAL-COMBUSTION ENGINE
Filed Jan. 18, 1950 9 Sheets-Sheet 1

Fig. 1.

Inventor:
Walter A. Parrish,
By Schroeder, Merriam,
Hofgren & Brady, Attys.

Sept. 23, 1952  W. A. PARRISH  2,611,349
OPPOSED PISTON INTERNAL-COMBUSTION ENGINE
Filed Jan. 18, 1950  9 Sheets-Sheet 8

Inventor:
Walter A. Parrish,
By Schroeder, Merriam,
Hofgren & Brady, Attys.

Patented Sept. 23, 1952

2,611,349

UNITED STATES PATENT OFFICE 2,611,349

OPPOSED PISTON INTERNAL-COMBUSTION ENGINE

Walter A. Parrish, Grosse Pointe Woods, Mich., assignor to Research Engineering Corporation, a corporation of Indiana Application January 18, 1950, Serial No. 139,228

30 Claims. (Cl. 123—51)

This invention relates to internal combustion engines and more particularly to a diesel engine of the opposed piston type.

While diesel engines are constructed in many forms the opposed piston two-cycle diesel engine has found favor because of its economy of weight and space. In engines of this type two pistons reciprocate within a single cylinder with combustion taking place in the space between pistons. It has been customary to provide opposed piston diesel engines with piston controlled ports, that is, with intake and exhaust ports formed in the sidewalls of the cylinder and controlled by the pistons as they reciprocate. Thus the pistons during their travel in the cylinder sequentially cover and uncover each set of ports. At the end of each power stroke burned gases within the cylinder must be evacuated therefrom. This is accomplished by the uncovering of the exhaust ports which permits some of the gases to escape under their own pressure and then uncovering the scavenging air intake ports to permit air to flush out the cylinder. Obviously the exhaust ports must be opened first in order to prevent the gases, which are under considerable pressure, from blowing back through the scavenging air system.

It has been customary in the past to achieve this prior opening of the exhaust ports in one of two ways. First by locating the exhaust ports closer to the center line of the cylinder than the intake ports so that the pistons, as they travel away from each other in a power stroke, first uncover the exhaust ports and then subsequently uncover the intake ports. The difficulty with this system is that while the exhaust ports are opened first, they are also closed last. As a result it is impossible to supercharge the cylinder as the air intake ports are closed off while the exhaust ports are still open.

The other method of achieving the prior opening of exhaust ports is to provide the exhaust piston with a lead over the intake piston. As the exhaust piston leads the intake piston it uncovers the exhaust ports before the intake piston uncovers the intake ports and subsequently covers the exhaust ports prior to the closing of the intake ports. There are several disadvantages to an engine of this type. In the first place, as the pistons are not in phase, the exhaust piston reaches the end of its power stroke as determined by the location of the exhaust ports when the other piston has completed only a portion of its outward travel. As a result, the effective power stroke of the intake piston is greatly shortened. One disadvantage in advancing the exhaust piston is the fact that such an engine cannot practically be balanced. Obviously, as the pistons are not in phase, a considerable amount of vibration is set up in the engine, particularly when operated at high R. P. M. Another disadvantage is the fact that such an engine is impossible to balance dynamically by conventional means. Primary unbalance can be corrected by counterweighting opposite the crank-throw, but secondary unbalance forces which operate at twice crank shaft speed require geared oppositely rotating counterweights rotating at twice crank shaft speed. This is a completely uneconomical solution. A further disadvantage of an out-of-phase engine is while the firing pressure is common between the two pistons and the force in pounds per square inch is the same on both piston tops, the force transmitted and converted into useful torque or turning effort by the intake crank is materially less than that transmitted by the exhaust crank, since the lead of the exhaust piston gives the greater lever advantage to the exhaust crank.

Other opposed-piston diesel engines have been constructed which are a combination of the two types just described in that the exhaust ports are positioned somewhat closer to the center line of the cylinder than the intake ports and the exhaust piston is given a slight lead. This latter type of engine has not solved the problem although with less lead given the exhaust piston the vibration is somewhat lessened.

I have invented, and am herein disclosing and claiming, a diesel engine of the opposed-piston type in which the exhaust ports are opened prior to the opening of the intake ports and are closed prior to the closing of the intake ports, and in which the pistons in the cylinder operate in phase. As the pistons are in phase, that is, as the exhaust piston is given no lead over the intake piston, the phasing of the pistons results in complete cancellation of unbalanced forces due to oppositely reciprocating parts. Both primary and secondary unbalanced forces are neutralized. Furthermore, as I close the exhaust ports prior to the closing of the intake ports, I am able to supercharge the cylinder to at least the scavenging air pressure before each injection.

According to this invention, I provide the engine with a number of piston-controlled intake and exhaust ports, and provide additional means operating independent of the exhaust piston for closing the exhaust ports prior to the closing of the intake ports by the intake piston. Furthermore, as the engine chosen as an exemplary disclosure is a marine diesel and hence liquid cooled, I provide the exhaust manifold of the engine, which houses the means for closing the exhaust ports with coolant passages. In order to take care of the differential expansion which exists between the cylinders and the exhaust manifold which surrounds the cylinders, I mount the exhaust manifold in a novel manner to provide an adequate seal between the exhaust gas passages and the coolant passages and yet permit differential expansion between the metals forming the cylinders and the exhaust manifold.

Other and further features of the invention will be apparent from the following description and drawings in which.

While the invention is susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

Figure 1:
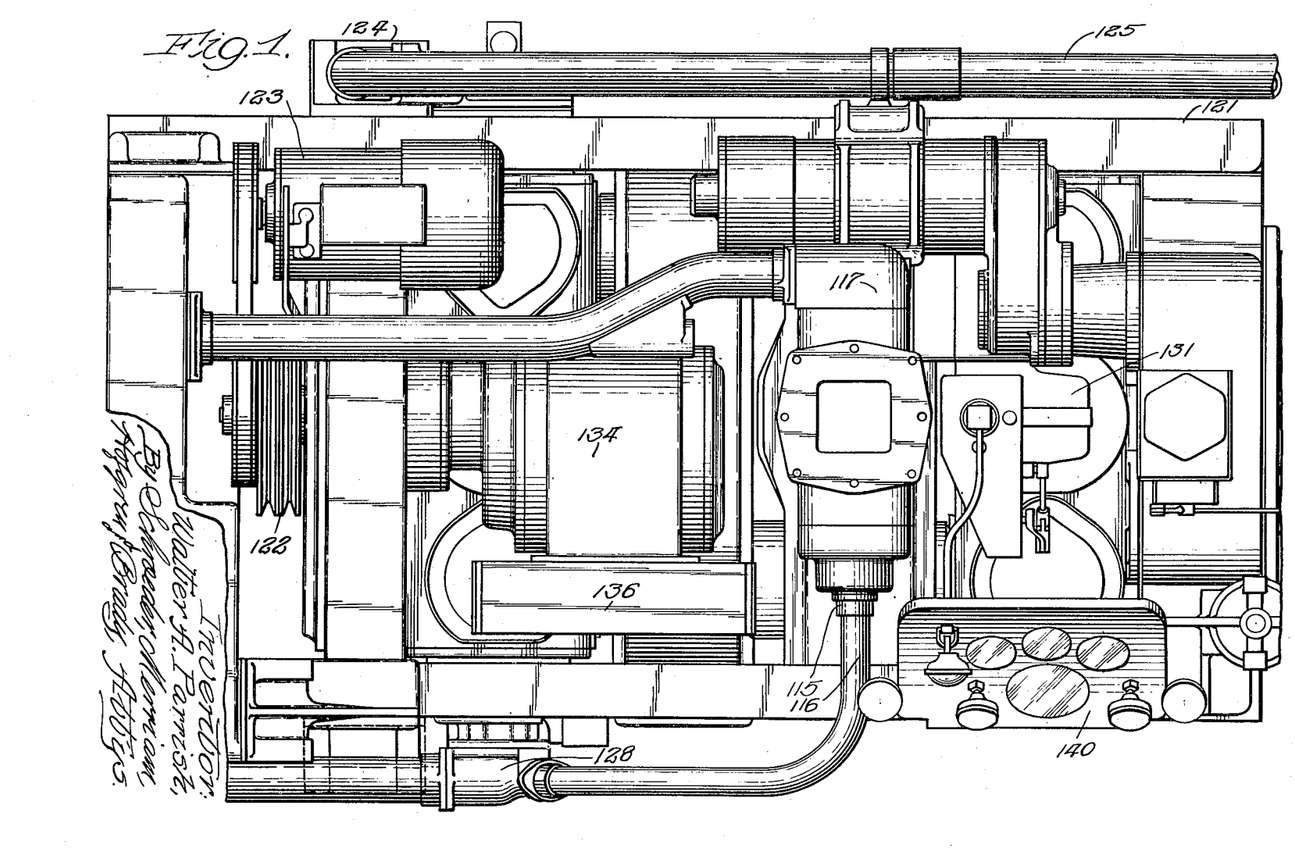
Fig. 1 is the top plan view of the engine complete with accessories.
Figure 2:
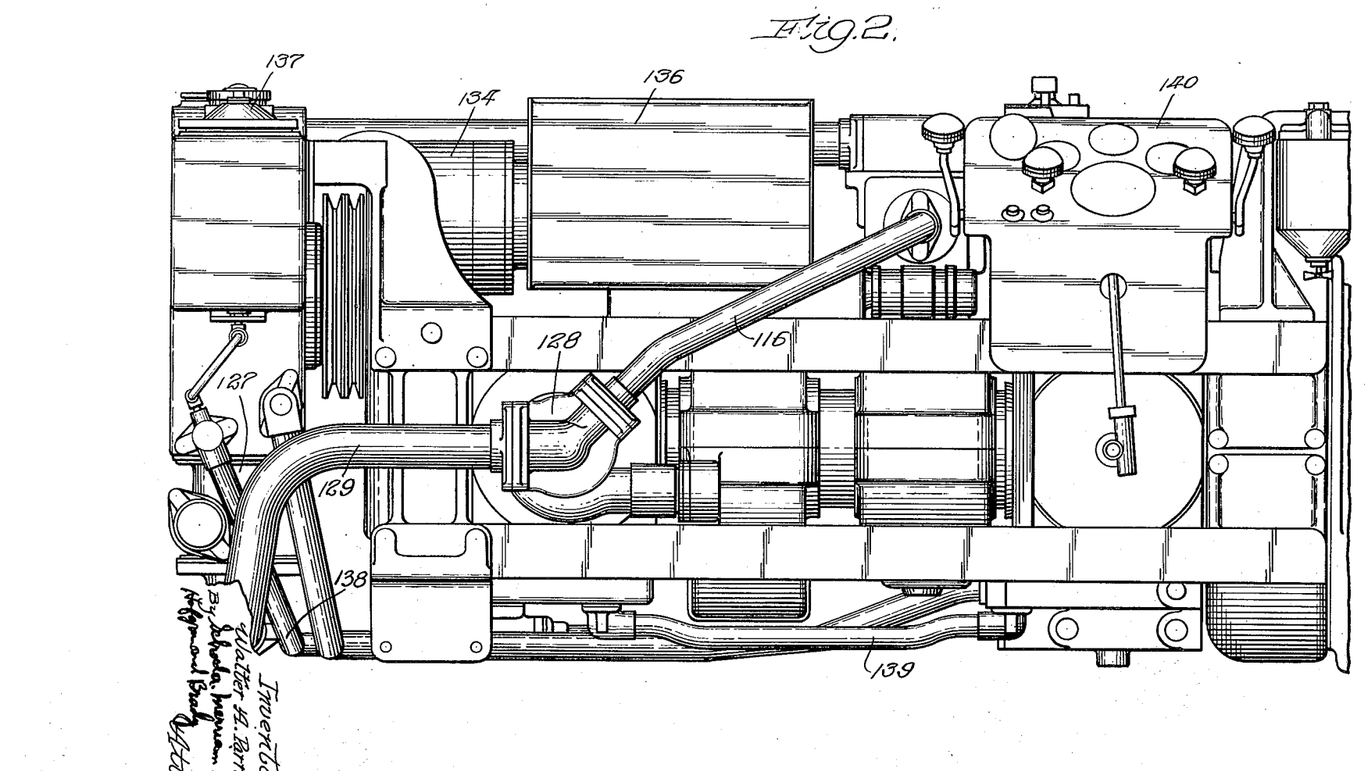
Fig. 2 is a side elevation of the engine of Fig. 1.
Figure 3:
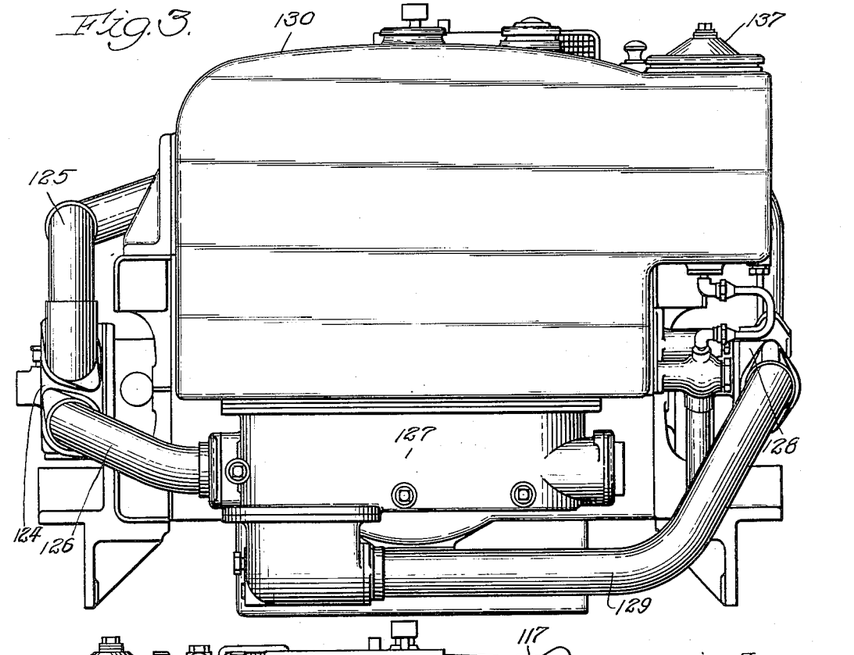
Figs. 3 and 4 are views of the left hand end and the right hand end respectively of Fig. 2.
Figure 4:
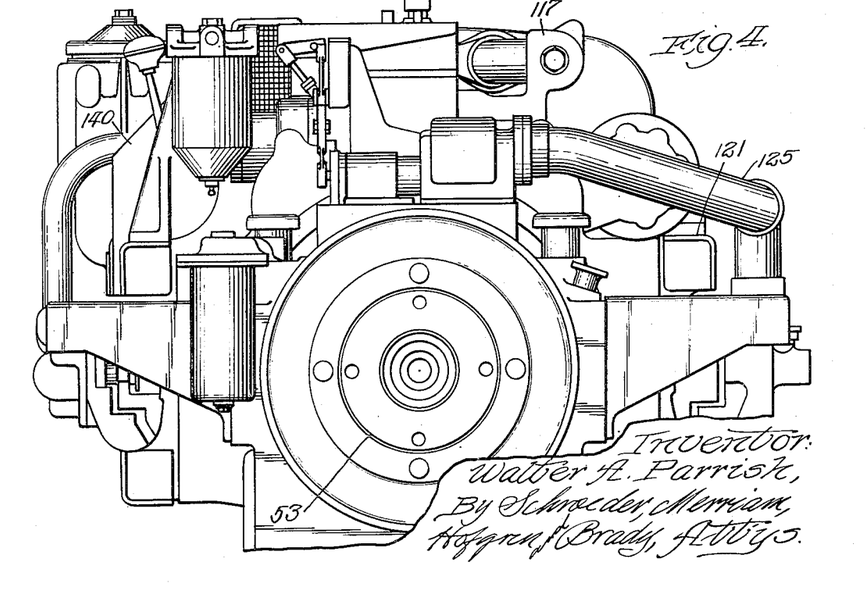
Figure 5:
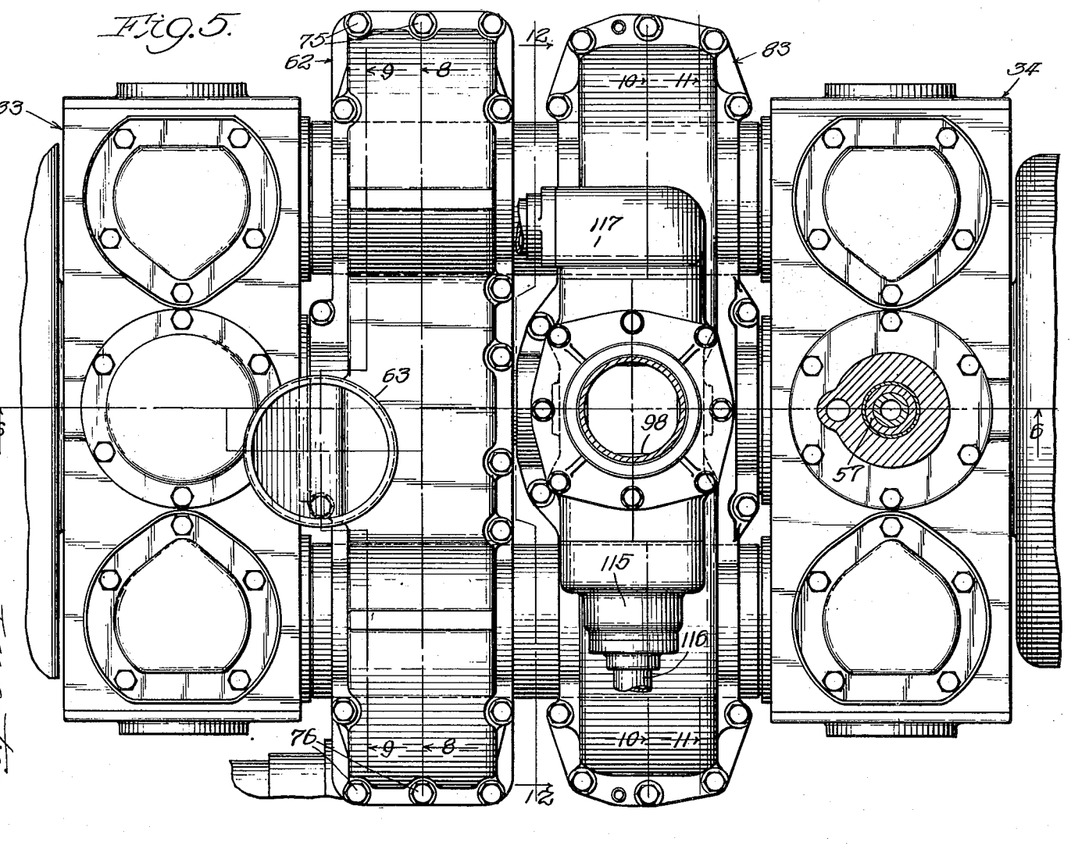
Fig. 5 is a view like Fig. 1 with the accessories removed and showing the details of the engine.
Figure 6:
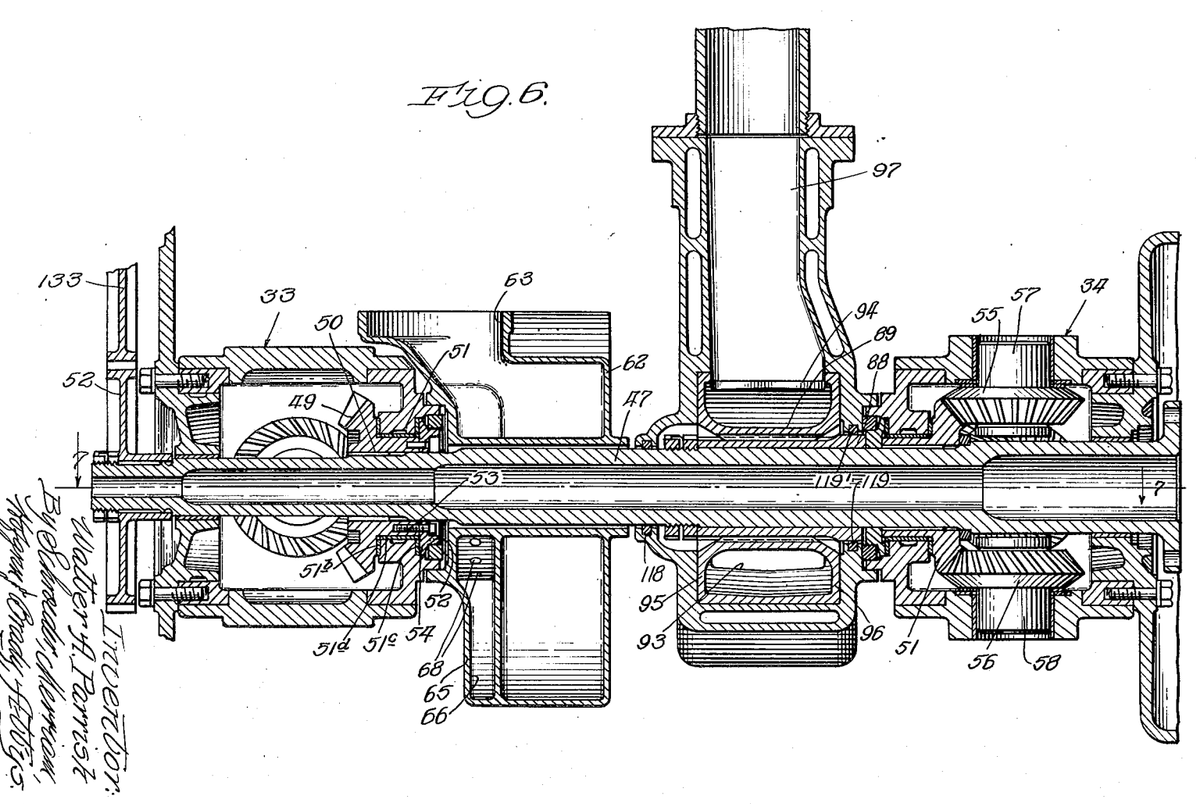
Fig. 6 is a vertical section along line 6—6 of Fig. 5.
Figure 7:
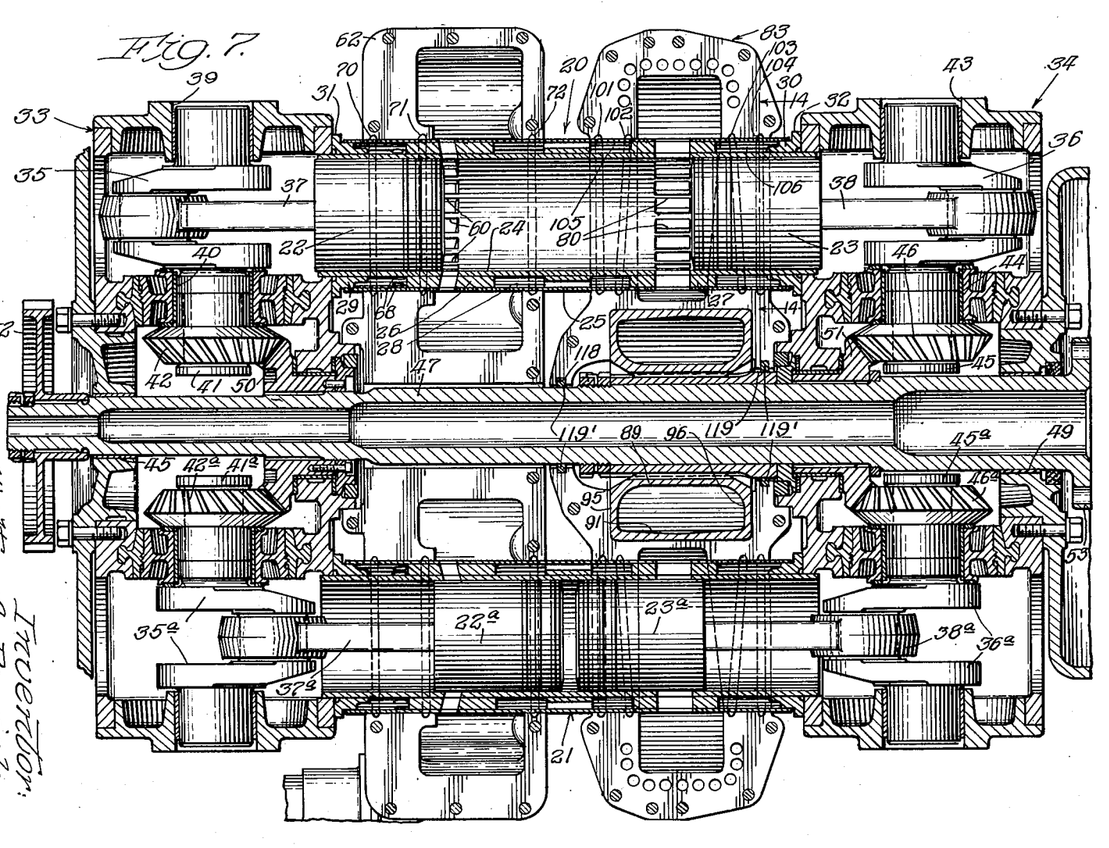
Fig. 7 is a horizontal section along line 7—7 of Fig. 6.

Referring now to Fig. 7, the engine comprises a pair of parallel cylinders 20 and 21. As the mechanism associated with each cylinder is similar in most instances to the mechanism associated with the other cylinder, only one will be described in detail and corresponding parts will be given corresponding reference numerals, with the letter "a" added, throughout. Each cylinder is provided with a pair of pistons 22 and 23 which are reciprocable therein. The cylinders consist of a liner 24 spaced from a water jacket 25 by annular collars 26 and 27. The space 28 between the liner and the jacket forms a passage for coolant which travels longitudinally of each cylinder. The ends of each passage are closed by collar portions 29 and 30 provided on end flanges 31 and 32. The end flange 31 is secured to a crank case 33 while the flange 32 is secured to a second crank case 34 at the opposite end of the cylinder. Each piston is connected to an individual crank shaft 35 and 36 by means of connecting rods 37 and 38. The crank shaft 35 is mounted upon bearings 39 and 40 and is provided at its inner end with a spiral bevel gear 42. Similarly, the crank shaft 36 is mounted upon bearings 43 and 44 in the crank case 34 and is provided at its inner end 45 with a second spiral bevel gear 46. A drive shaft 47 is rotatably mounted (at its right hand end as seen in Fig. 6) upon bearings 48 positioned at the outer end of the shaft. The drive shaft extends the entire length of the engine parallel to the cylinders and is provided with a spiral bevel gear 49 which meshes with the gears 42 and 42a and with a second spiral bevel gear 50 meshing with the gears 45 and 45a. In order to allow for thermal expansion of the drive shaft 47, the front, or left hand portion as seen in Fig. 6, is secured to the gear 49 by a spline arrangement 50 in a manner permitting sufficient longitudinal movement of the shaft through the gear to take care of changes in the length of the drive shaft with changes of its temperature. The gear 49 is rotatably mounted in a three surface bearing 51, the bearing having two thrust surfaces 51b and 51c, and a radial bearing surface 51d. An annular flange 52 is secured to the gear 49 by bolts 53 and is provided with a bearing portion 54 engaging the thrust surface 51c.

As can best be seen in Fig. 6, the gear 50 also meshes with two additional spiral bevel gears 55 and 56 secured to shafts 57 and 58 mounted for rotation about a vertical axis in the crank case 34. The shafts 57 and 58 drive the fuel injector pump and the lubricating oil pump as will be hereinafter explained.

Figure 8:
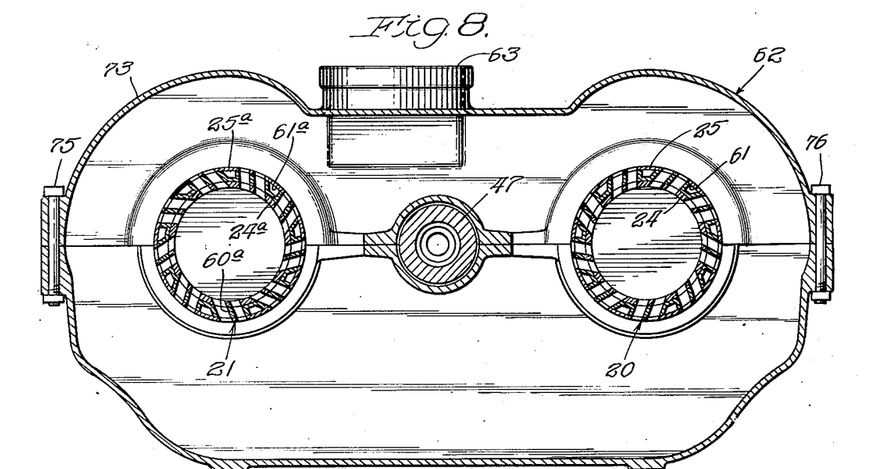
Figs. 8 to 12 inclusive are sections along lines 8—8, 9—9, 10—10, 11—11, and 12—12 respectively of Fig. 5.
Figure 9:
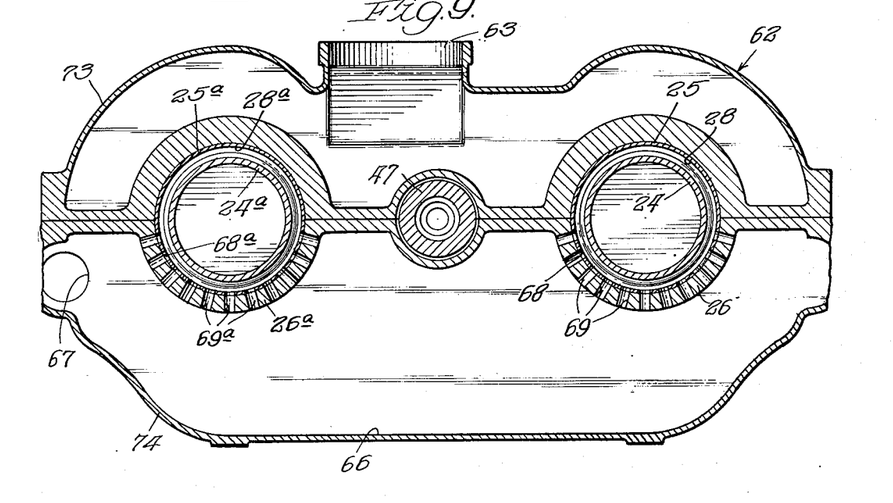

Each cylinder is provided with a number of scavenging air intake ports 60. These ports extend through openings in the collar 26 which is also provided with longitudinal passages 61 separate from the intake openings to permit the flow of coolant therethrough. As will be noted from an examination of Fig. 8, the intake ports are directed tangentially of the cylinder 20, that is, the intake ports are tangent to a number of circles concentric with the cylinder. As can be seen from the drawings, alternate intake ports 60' are directed tangentially to a first circle concentric with the cylinder but having a smaller diameter than the cylinder while the intermediate ports 60'' are parallel to one of the adjacent ports 60' so as to be tangential to a second circle having a diameter differing from the cylinder and the first circle. Thus the intake ports are arranged in a plurality of pairs, with the ports in each pair being parallel to the other port in the pair and each tangential to a different circle concentric with but smaller in diameter than the cylinder. This arrangement, which is duplicated in the exhaust ports hereinafter to be described, produces an air piston in the cylinder when the ports are open. Extremely effective scavenging is obtained as the incoming air, as directed by the intake ports, forms a cylindrical mass of spiraling air which maintains its identity and form as it travels toward the exhaust ports to sweep burned gases out of the cylinder. The scavenging air is introduced to the cylinder through the ports 60 by means of an aluminum scavenging air manifold 62 which surrounds the intake end of each cylinder. Scavenging air is supplied to the manifold 62 through an inlet 63. As can best be seen in Fig. 6, the manifold 62 is provided in its lower portion with a wall 64 which, with the end wall 65, forms a coolant chamber 66 to which water may be introduced through the opening 67. Approximately the lower half of the jacket 25 is provided with a number of openings 68 located within the chamber 66 so that coolant may pass into the passage 28. In order to provide an effective seal between the manifold 62 and the cylinder 20, I provide that portion of the manifold which surrounds the cylinders with annular grooves 70, 71 and 72, in which annular neoprene sealing rings are located. The sealing rings in the grooves 70 and 71 seal the coolant passages 69 against leakage at the juncture of the manifold 62 and the cylinder while the sealing rings in the groove 72 in conjunction with those in the groove to seal the intake ports 60 against leakage at the juncture with the manifold. As will be noted from Figs. 8 and 9, the manifold 62 is divided into two parts, the upper half 73 being secured to the lower half 74 by means of a plurality of bolts 75 and 76. By reason of construction just described, the sealing rings are easily matched with the annular grooves and when assembled the manifold 62 floats on the cylinders 20 and 21. Thus a sealing fit is assured even through a rather wide range of differential expansion.

Each cylinder is also provided with a plurality of exhaust ports 80. As will be noted from an examination of Fig. 7, the left hand end of the exhaust ports are closer to the center line of the piston than the right hand end of the intake ports. Thus, the exhaust ports are uncovered by the exhaust piston 23 before the intake ports are uncovered by the intake piston 22. The outer or right hand end of the exhaust ports are the same distance from the center line of the piston, as is the outer or left hand end of the intake ports, and, thus, the exhaust ports are somewhat elongated as compared with the intake ports. As will be noted from Fig. 10, the exhaust ports 80 are also directed tangentially to the cylinder as were the intake ports; that is, the exhaust ports are in a plurality of pairs with the first port 80' in each pair being parallel to the second port 80'' and with the ports in each pair each being directed tangentially to a circle of different diameter. To this end openings 81 are drilled through the collar 27, the openings matching the ports 80. Longitudinal passages 82 are also drilled through the collar 27 to provide passage for the cooling fluid.

An aluminum exhaust manifold 83 surrounds the exhaust ports and is provided with an inner wall 84 defining an exhaust chamber 85 surrounding the exhaust ports and connected by means of a passage 86 to a valve chamber 87. The chamber 85 is helical in shape and expands in the direction of travel of the expanding gases exhausting through the ports 80. Keyed to the drive shaft 47 is a splined sleeve 88 which is located in the valve chamber 87 and to which is secured the hub portion 89 of a rotary valve 90 preferably of cast iron. The valve is slidable longitudinally of the drive shaft on the sleeve to allow the valve to position itself within the valve chamber. The valve is provided with a valving rim 91 having three openings 92, 93 and 94 therein. End walls 95 and 96 connect the hub with the rim and thus provide a valve capable of sealing off the valving chamber from the exhaust chamber except, of course, at the location of the openings 92—94. The valve 90 rotates with the drive shaft 47 which, by the arrangement of gears shown, rotates at two-thirds the speed of the crank shafts 35 and 36. Thus the crank shafts rotate three times for every two rotations of the drive shaft. Connected to the valve chamber 87 is an exhaust outlet 97 which may be connected at 98 to the atmosphere or an exhaust muffler.

Figure 10:
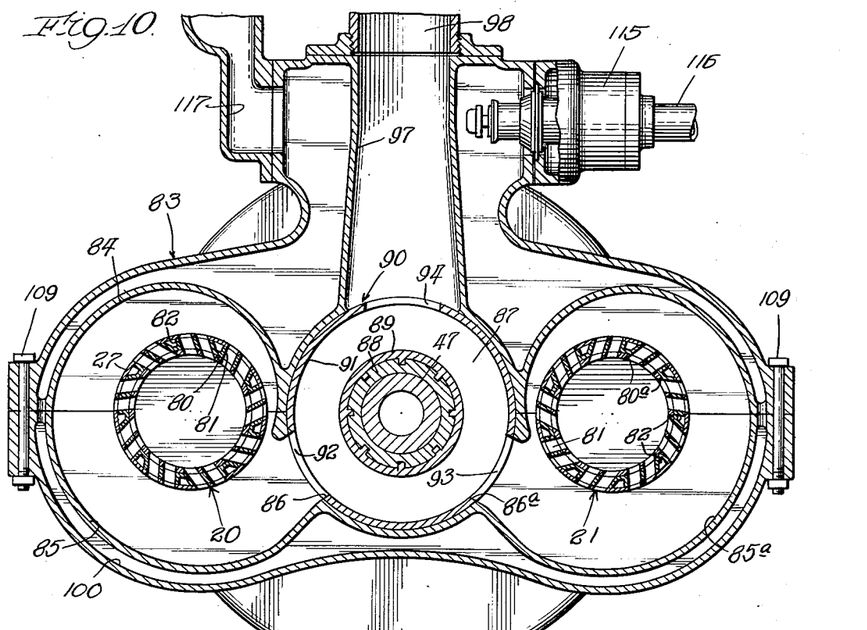

As previously stated, the pistons 22 and 23 are in phase. The exhaust ports 80 are so positioned as to be uncovered by the exhaust piston 23 when the crank shaft attached to that piston has rotated 105 degrees from dead center or zero degree position. The openings 92—94 in the valving rim of the valve are so located as to open the passage 86 between the exhaust chamber and the valve chamber when the crank shaft has rotated 95 degrees and thus when the exhaust ports are uncovered the passage 86 is already open. Exhaust from the cylinder continues through the next 23½ degrees of rotation of the crank shaft, that is, until the crank shaft has rotated 128½ degrees. At that point the piston 22 uncovers the scavenging air ports 60. For the next 77½ degrees of rotation of the crank shaft scavenging air entering through port 60 passes through the cylinder in an uninterrupted spiral induced by the tangentially arranged intake ports and thence exits via the exhaust ports. Due to the tangential arrangement of these latter ports the spiraling stream of scavenging air is uninterrupted in its passage through the intake ports, the cylinder, exhaust ports and into the exhaust chamber 85. This spiraling of the air in the cylinder continues throughout the compression stroke and promotes the necessary degree of intermixture of fuel and air to insure rapid initiation of combustion following injection. When the crank shaft has rotated 206 degrees the valve 90 has rotated to the point where the solid portion of the valving rim closes the passage 86. When this occurs exhaust ceases even though the exhaust piston has not as yet covered the exhaust ports 80. For the next 25½ degrees of rotation of the crank shaft scavenging air is continuously introduced into the cylinder through the ports 60 to supercharge the cylinder. When the crank shaft has rotated 232 degrees the intake piston 22 covers the intake ports, shutting off the flow of scavenging air and starting compression. When the crank shaft has rotated 255 degrees the exhaust piston covers the exhaust ports 80 and the compression continues. During the time that the passage 86 was open, the passage 86a connected to the chamber 85a to which the exhaust ports 80a discharge was also open. However, the exhaust ports in the cylinder 21 were closed at that time by the exhaust piston 23a therein (as shown in Fig. 7) so that no exhaustion of gases occurred. Obviously, when exhaust gases from the discharge ports 80 enter the exhaust chamber 87 through the opening 86 they are discharged from the chamber and into the outlet 97 through the opening 94 as shown in Fig. 10.

The exhaust cycle expressed in terms of rotation of the valve 90 is as follows: when the valve first begins to open the exhaust ports are still closed; 6° 40' of rotation after opening the exhaust ports are uncovered and gases are exhausted; 22° 20' of rotation after opening, the intake ports are uncovered and a mixture of gas and scavenging air is exhausted; 37° 00' of rotation after opening the valve is fully opened as exhaust of gas and scavenging air continues; 74° 00' after opening, the valve closes, stopping exhaustion.

It should be clear from the foregoing that the valve 90 is never subjected to the high pressures existing in the cylinder. The valve serves only to terminate the exhaust period and is subject only to the pressures in the cylinder during the time of scavenging and supercharging and the early stages of the compression cycle. During the later stages of heavy compression and, of course, during injection and combustion of fuel, the exhaust piston covers the exhaust ports so that the pressures in the cylinder are not transmitted to the rotary valve 90.

Figure 11:
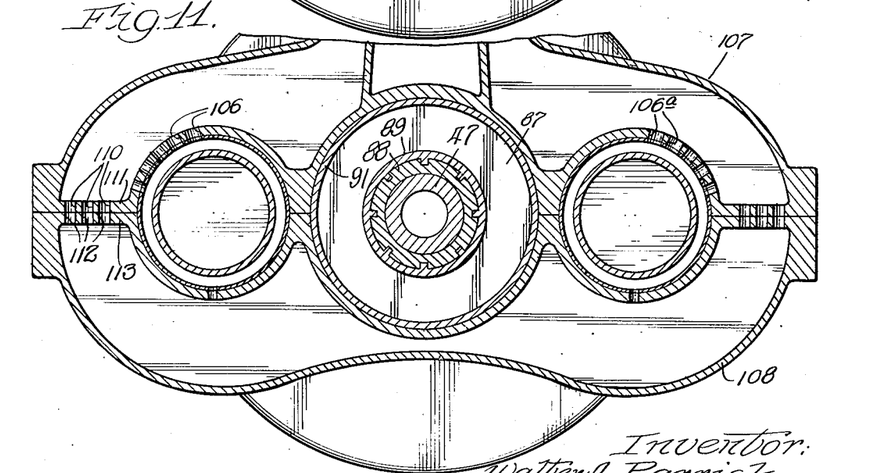
Figure 13:
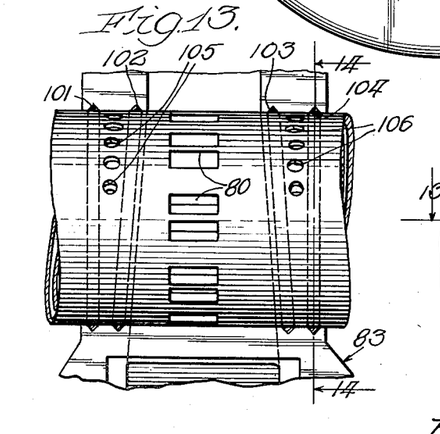
Fig. 13 is a partial section along line 13—13 of Fig. 14.
Figure 14:
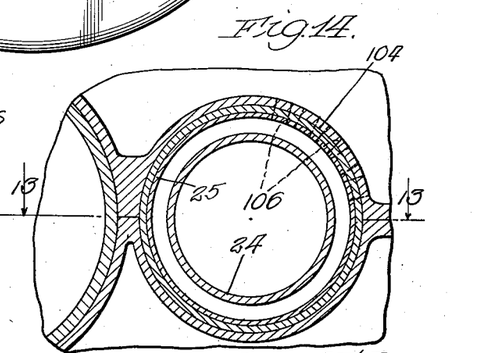
Fig. 14 is a section along line 14—14 of Figs. 7 and 13.

Surrounding the exhaust chamber 85 is a coolant chamber 100 through which liquid coolant is conducted to keep the temperatures in the exhaust manifold within the designed range. For this purpose, the portion of the exhaust manifold surrounding the cylinders is provided with annular grooves 101, 102, 103, and 104 (Figs. 7 and 13). Sealing rings placed in these grooves provide a seal between the exhaust manifold and the cylinder, the seal being located on either side of a first plurality of openings 105 in the cylinder jacket 25 and a second plurality of openings 106 in the cylinder jacket with the openings 105 and 106 being located on either side of the exhaust ports 80. Thus, the coolant within the coolant jacket 28 enters the exhaust manifold on both sides of the exhaust ports. As can be seen from Fig. 11, the exhaust manifold is in two parts, namely, an upper half 107 and a lower half 108 secured to the upper half by means of the bolts 109. A plurality of openings 110 are provided in a flanged portion 111 on the upper half, which match similar openings 112 formed in a corresponding flange portion 113 in the lower half in order that coolant exiting through the holes 105 and 106 may fill both the upper and lower part of the exhaust manifold. A thermostat 115 is located in the upper portion of the exhaust manifold in communication with the coolant therewithin. A pipe 116 connects the thermostat with a fresh water pump to circulate coolant throughout the system. When the motor is first started and the water is cold, the thermostat remains closed so that the circulation of water is between the water outlet pipe 117 and the water intake in the manifold 62. After the engine has become warm the thermostat opens and water is then drawn out through the pipe 116 to be cooled.

The exhaust manifold is provided with annular grooves 118 and 119 at the location of the drive shaft, which grooves carry sealing rings 119' in sealing engagement with the drive shaft. The rings 119' are bronze at the area of contact with the drive shaft and are backed by a resilient material such as impregnated felt seating in the grooves 118 and 119.

Figure 12:
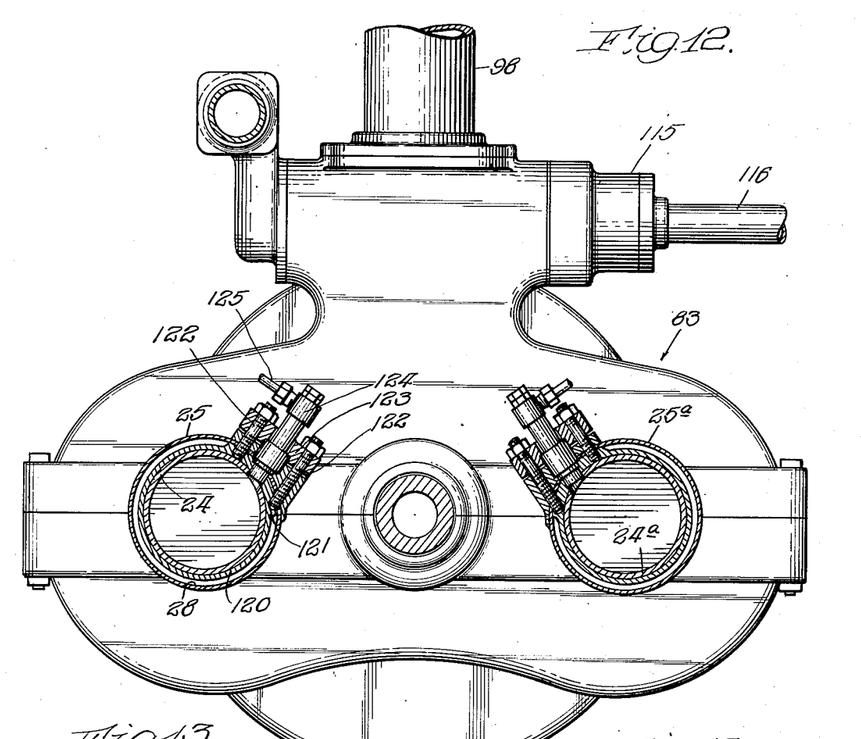

Means located at the center line of the cylinder is provided for injecting fuel into the cylinder for combustion. As best shown in Fig. 12, the liner 24 of each cylinder is surrounded with an annular collar 120 which has a thickness less than the thickness of the cooling chamber 28 in order to permit longitudinal passage of cooling water. Each collar 120 is provided with a boss portion 121 in contact with the jacket 28 and the liner 24. The boss portion 121 is drilled to receive the bolts 122 which secure a fitting 123 thereto. Mounted in the fitting is an injection nozzle 124 connected by a pipe 125 to the fuel injection pump. It will be noted that the injection nozzles 124 are not directed radially of the cylinder but rather tangent to a circle concentric with the cylinder. By this means I find I can provide a more efficient combustion of fuel.

As will be seen in Figs. 1 to 4 inclusive, the engine is mounted upon a frame 121 and is provided with a number of accessories. Adjacent the front end of the engine a number of V belt pulleys 122 are secured to the front end of the drive shaft 47 and serve to drive a generator 123 and other accessories as desired. As previously stated, the particular embodiment of the engine shown is a marine diesel and hence means are provided for using sea water in a heat exchanger to cool the fresh water coolant which is circulated through the engine.

To this end a sea water pump 124 draws sea water through an intake line 125 and delivers it by means of a pipe 126 to a heat exchanger 127. Fresh water drawn from exhaust manifold through the line 116 by means of the fresh water pump 128 is delivered by means of a line 129 to the heat exchanger and thence to an expansion tank 130. Cooled fresh water is drawn from the tank 13 and introduced into the water intake manifold 66 to be circulated through the cylinders as previously described.

The take-off shaft 57 drives a fuel injection pump 131 to supply the fuel under high pressure to the injection nozzles. Secured to the front end of the drive shaft is a gear 132 (Fig. 6) which meshes with a second gear 133 secured to an air blower 134 to supply scavenging air under pressure to the air inlet 63. The rear of the drive shaft carries a flange 135 to be secured to a flywheel and reverse gear system. An air filter 136 is secured to the blower and serves in the dual capacity of filter and silencer. A lube oil tank 137 is connected by means of a line 138 to a lube oil pump which supplies lubricating oils by means of the line 139 to the crank cases and bearings in the usual manner, and to the spiral bevel gears through a metered orifice.

An instrument panel 140 is provided which includes various engine instruments and controls.

One of the added advantages of the engine of this construction is that the outer end of each of the crank shafts can be used to deliver power to various accessories. Thus, in the particular embodiment shown the sea and fresh water pumps are connected directly to the crank shafts and are driven thereby. The lubricating oil pump may be similarly driven together with other accessories as desired.

I claim:

1. In an in-phase opposed piston two-cycle diesel engine having a plurality of piston controlled exhaust and intake ports in the cylinder with the exhaust ports being closer to the center of the cylinder than the intake ports, means for opening the exhaust ports ahead of the opening of the intake ports on the power stroke and means for closing the exhaust ports ahead of the closing of the intake ports on the charging stroke.

2. In an in-phase opposed piston diesel engine having a cylinder, a plurality of piston controlled exhaust and intake ports in the cylinder opened and closed by reciprocation of the pistons therewithin and in which the exhaust ports are located closer to the center line of the cylinder than the intake ports and thereby are uncovered prior to and covered subsequent to the respective covering and uncovering of the intake ports, exhaust control means comprising an exhaust passage connecting at one end to the exhaust ports and at the other end to the atmosphere, a valve operating independently of the pistons and controlling said passage for terminating exhaust from the exhaust ports in advance of the covering thereof by the piston.

3. In an opposed piston diesel engine, a cylinder, a pair of pistons reciprocably mounted within the cylinder, a plurality of piston controlled intake ports and a plurality of piston controlled exhaust ports in the cylinder, said exhaust ports being positioned closer to the center line of the cylinder than the intake ports, all of said ports having opened and closed periods determined by the position of the pistons with respect thereto, said pistons operating in phase whereby one of said pistons uncovers the exhaust ports before the other piston uncovers the intake ports, an exhaust manifold connected to the exhaust ports, a passage connecting the exhaust manifold with the atmosphere, and a rotary valve operating independently of the pistons and controlling said passage, said valve operating to close said passage prior to the closing of the intake ports by said last mentioned piston.

4. In an opposed piston diesel engine having a plurality of parallel cylinders, a crankshaft driven by each piston, a drive shaft parallel to the cylinders and driven by the crankshafts, and a plurality of piston controlled exhaust ports in each cylinder, valve means for controlling exhaust comprising an exhaust manifold surrounding the exhaust ports and having a chamber surrounding the drive shaft, an outlet from the chamber, a passage in the manifold connecting the ports to the chamber and a rotary valve in the chamber and mounted on the drive shaft and controlling the passages.

5. In an in-phase opposed piston diesel engine having a cylinder, a pair of pistons reciprocable in the cylinder, a separate crankshaft connected to and driven by each of the pistons, timing means comprising an annulus of intake ports in the cylinder and controlled by one of the pistons and an annulus of exhaust ports in the cylinder and controlled by the other piston, said exhaust ports being so positioned as to be uncovered by said other piston during approximately 150° of rotation of the crankshafts, an exhaust passage connected to the exhaust ports, and a valve adapted to close the passage during approximately the last 50° of said rotation.

6. In an in-phase opposed piston two cycle diesel engine having a drive shaft rotated by the engine, valving means comprising a plurality of exhaust ports formed in the cylinder and covered and uncovered with reciprocation of the exhaust piston, a passage connecting the exhaust ports to the atmosphere, a rotary valve in said passage and controlling the passage, said valve being connected to the drive shaft to be driven in timed relationship with the reciprocation of the pistons, said valve being adapted to open said passage immediately prior to the uncovering of the exhaust ports by the piston and said valve being adapted to close said passage an appreciable period before said ports are covered by the exhaust piston during the scavenging cycle of the engine.

7. In a diesel engine having a plurality of parallel cylinders, a pair of opposed pistons in each cylinder, a crankshaft for each piston, a rotatably mounted drive shaft parallel to the cylinders, and gear means connecting the crankshafts to the drive shaft, porting means comprising, a plurality of piston controlled exhaust and intake ports in each cylinder, an exhaust manifold having a portion surrounding the exhaust ports and having a chamber surrounding the drive shaft, an exhaust passage in the manifold connecting the portion to the chamber, an outlet passage in the manifold opening to the atmosphere, a rotary valve in the chamber and mounted on the drive shaft, said valve having a hollow body portion and a valving rim, and an opening in the rim for each passage with the openings controlling the passages.

8. Apparatus of the character described in claim 7 in which said cylinders and said manifold are of dissimilar metal and including means for mounting the manifold on the cylinder comprising an annular groove formed in the manifold and surrounding the cylinder, and a resilient annular seal seated in the groove and in sealing contact with the cylinder.

9. Apparatus of the character described in claim 7 in which the exhaust ports are directed tangentially to circles concentric to the cylinder and in which said portion of the exhaust manifold is in the form of a helical chamber.

10. Apparatus of the character described in claim 9 in which said exhaust ports are inclined in the direction of expansion of the helical chamber.

11. Apparatus of the character described in claim 9 in which the largest portion of the helical chamber is located at the outer extremity of the exhaust passage.

12. Apparatus of the character described in claim 7 in which said rotary valve is slidably mounted on the drive shaft for sliding movement longitudinally thereof.

13. Apparatus of the character described in claim 7 in which said gear means is so proportioned as to rotate the drive shaft twice for each three rotations of said crankshafts.

14. Apparatus of the character described in claim 7 in which said gear means comprises a spiral bevel gear on each crankshaft meshing with a spiral bevel gear on the drive shaft with the ratio between the crankshaft gears and the drive shaft gears being three to two.

15. In an opposed piston diesel engine having a plurality of parallel cylinders, a crankshaft driven by each piston, a drive shaft between and parallel to the cylinders and driven by the crankshafts, an exhaust manifold having a portion surrounding the exhaust ports and having a central chamber surrounding the drive shaft and a rotary valve on the drive shaft for controlling exhaust, a floating mount for the manifold comprising a pair of annular grooves formed in said portion of the manifold, an annular resilient seal in each groove and in sealing contact with the cylinder, and a plurality of resiliently mounted metallic seals in the manifold surrounding and contacting the drive shaft.

16. In an opposed piston marine diesel engine having a plurality of parallel cylinders, a crankshaft driven by each piston, a drive shaft parallel to the cylinders and driven by the crankshaft, and a plurality of piston controlled exhaust ports in each cylinder, exhaust means comprising an exhaust manifold having a portion surrounding the cylinder at the exhaust ports and having a chamber surrounding the drive shaft, a passage in the manifold connecting the chamber to the exhaust ports, coolant passages in the cylinder on either side of the exhaust ports, matching coolant passages in said portion of the manifold, a plurality of annular grooves formed in said portion of the manifold on opposite sides of each coolant passage therein, and a resilient ring in each groove and contacting the cylinder.

17. In an internal combustion engine having a drive shaft, a plurality of cylinders parallel to and surrounding the drive shaft, a pair of pistons in each cylinder, a crankshaft at each end of each cylinder and connected to a piston therein and a bevel gear on each crankshaft, means for permitting thermal expansion of the drive shaft comprising a bevel gear on one end of the drive shaft and engaging the bevel gears at one end of the cylinders, a second bevel gear on the other end of the drive shaft and engaging the bevel gears at the other end of the cylinders, a first bearing carrying one end of the drive shaft, a second bearing carrying the bevel gear on the other end of the drive shaft, and a spline connection between said last mentioned bevel gear and said other end of the drive shaft.

18. In an internal combustion engine having a drive shaft, a plurality of cylinders parallel to and surrounding the drive shaft, a pair of pistons in each cylinder, a crankshaft at each end of each cylinder and connected to a piston therein and a bevel gear on each crankshaft, means for permitting thermal expansion of the drive shaft comprising a bevel gear on one end of the drive shaft and engaging the bevel gears at one end of the cylinders, a second bevel gear on the other end of the drive shaft and engaging the bevel gears at the other end of the cylinders, a first bearing carrying one end of the drive shaft, a second bearing carrying the bevel gear on the other end of the drive shaft, and means connecting the drive shaft to said last mentioned bevel gear, said connecting means preventing relative rotation between said drive shaft and said last mentioned bevel gear and permitting relative movement longitudinal of the drive shaft therebetween.

19. In an opposed piston diesel engine having a plurality of parallel cylinders, a crankshaft driven by each piston, a drive shaft parallel to the cylinders and driven by the crankshafts, and a plurality of piston controlled exhaust ports in each cylinder, valve means for controlling exhaust comprising an exhaust manifold communicating with the exhaust ports and having a chamber about the drive shaft, an outlet from the chamber, passages in the manifold connecting the ports to the chamber and a rotary valve in the chamber and rotated by the drive shaft and controlling the passages.

20. In an in-phase opposed piston diesel engine having a plurality of parallel cylinders, a crankshaft driven by each piston, a drive shaft parallel to the cylinders and driven by the crankshafts and a plurality of piston controlled exhaust and intake ports in each cylinder with the exhaust ports being closer to the center line of the cylinder than the intake ports, valve means for controlling exhaust comprising an exhaust manifold communicating with the exhaust ports and having a circular chamber, an outlet from the chamber to the atmosphere, passages in the manifold connecting all of the exhaust ports to the chamber and a rotary valve in the chamber and driven by the drive shaft, said rotary valve having a valving rim and an opening in the rim for each passage for controlling the passages.

21. In an in-phase opposed piston diesel engine having a cylinder, an annulus of intake ports in the cylinder and controlled by one of the pistons and an annulus of exhaust ports in the cylinder and controlled by the other piston, said exhaust ports being closer to the center line of the cylinder than the intake ports and a drive shaft driven by the pistons, valve means for controlling exhaust comprising an exhaust manifold communicating with the exhaust ports and having a circular chamber communicating with the atmosphere, a passage in the manifold connecting the exhaust ports to the chamber and a rotary valve in the chamber and rotated by the drive shaft, said rotary valve having a valving rim and an opening in the rim controlling the passage.

22. In an in-phase opposed piston diesel engine having a cylinder, an annulus of intake ports in the cylinder and controlled by one of the pistons and an annulus of exhaust ports in the cylinder and controlled by the other piston, said exhaust ports being closer to the center line of the cylinder than the intake ports and a drive shaft driven by the pistons, valve means for controlling exhaust comprising an exhaust manifold surrounding the exhaust ports and having a chamber surrounding the drive shaft, an outlet from the chamber to the atmosphere, a passage in the manifold connecting the exhaust ports to the chamber and a rotary valve in the chamber and mounted on the drive shaft and controlling the passage.

23. In a diesel engine having a plurality of parallel cylinders, a pair of opposed pistons in each cylinder, a crankshaft for each piston, a rotatably mounted drive shaft paralled to the cylinders, and gear means connecting the crankshafts to the drive shaft, porting means comprising, a plurality of piston controlled exhaust and intake ports in each cylinder with the intake ports being arranged in an annulus around the cylinder with alternate ports being directed tangentially of a circle concentric with the cylinder and smaller in diameter than the cylinder and with intermediate ports being parallel to one of the adjacent alternate ports and directed tangentially of another circle concentric with the cylinder and differing in diameter from the first circle, an exhaust manifold having a portion surrounding the exhaust ports and having a chamber surrounding the drive shaft, an exhaust passage in the manifold connecting the portion to the chamber, an outlet passage in the manifold opening to the atmosphere, a rotary valve in the chamber and mounted on the drive shaft, said valve having a hollow body portion and a valving rim, and an opening in the rim for each passage with the openings controlling the passages.

24. The engine of claim 23 in which said exhaust ports are arranged in an annulus around the cylinder with alternate exhaust ports being directed tangentially of a circle concentric with the cylinder and smaller in diameter than the cylinder and with intermediate exhaust ports being parallel to one of the adjacent alternate exhaust ports and directed tangentially of a second circle concentric with the cylinder and differing in diameter from the first circle.

25. The engine of claim 24 in which said portion of the exhaust manifold is in the form of a helical chamber and in which said exhaust ports are inclined in the direction of expansion of the helical chamber.

26. In an opposed piston diesel engine having a cylinder and a pair of pistons reciprocable in the cylinder, porting means comprising, a plurality of piston controlled exhaust and intake ports formed in each cylinder with the intake ports being arranged in an annulus around the cylinder with alternate ports being directed tangentially of a circle concentric with the cylinder and smaller in diameter than the cylinder and with intermediate ports being parallel to one of the adjacent alternate ports and directed tangentially of a second circle concentric with the cylinder and differing in diameter from the first circle.

27. In an opposed piston diesel engine having a cylinder and a pair of pistons reciprocable in the cylinder, porting means comprising, a plurality of piston controlled exhaust and intake ports formed in each cylinder with the intake ports being arranged in an annulus comprising a plurality of groups of ports with all of the ports in each group being parallel to the other ports in said group and with each port in each group being directed tangentially of a different circle having a diameter smaller than the diameter of the cylinder and concentric therewith.

28. In an opposed piston diesel engine having a cylinder and a pair of pistons reciprocable in the cylinder, porting means comprising, a plurality of piston controlled exhaust and intake ports formed in each cylinder with the intake ports being arranged in an annulus comprising a plurality of pairs of ports with one of the ports in each pair being parallel to the other port in said pair and with each port in each pair being directed tangentially of a different circle having a diameter smaller than the diameter of the cylinder and concentric therewith.

29. In an opposed piston diesel engine having a cylinder and a pair of pistons reciprocable in the cylinder, porting means comprising, a plurality of piston controlled exhaust and intake ports formed in each cylinder with the intake ports being arranged in a first annulus around the cylinder and with the exhaust ports being arranged in a second annulus around the cylinder, alternate ports in each annulus being directed tangentially of a circle concentric with the cylinder and smaller in diameter than the cylinder and with intermediate ports in each annulus being parallel to one of the adjacent alternate ports and directed tangentially of a second circle concentric with the cylinder and different in diameter from the first circle.

30. The diesel engine of claim 29 including an exhaust manifold having a portion surrounding the exhaust ports, said portion being in the form of a helical chamber and in which said exhaust ports are inclined in the direction of expansion of the helical chamber.

WALTER A. PARRISH.

REFERENCES CITED

The following references are of record in the file of this patent:

UNITED STATES PATENTS

| Number | Name | Date |
|---|---|---|
| 1,162,054 | Hansen | Nov. 30, 1915 |
| 1,166,916 | Lemp | Jan. 4, 1916 |
| 1,168,877 | Froelich | Jan. 18, 1916 |
| 1,530,414 | Romeyn | Mar. 17, 1925 |
| 1,664,086 | Olsen | Mar. 27, 1928 |
| 1,699,111 | Lyons | Jan. 15, 1929 |
| 2,042,722 | Mackenzie | June 2, 1936 |
| 2,067,496 | McCarthy | Jan. 12, 1937 |
| 2,303,714 | Wydler | Dec. 1, 1942 |